United States Patent [19]

Harasewych

[11] 4,236,547
[45] Dec. 2, 1980

[54] SELF-CLEANING VALVE PLUG AND SEAT ASSEMBLY

[75] Inventor: Bohdan A. Harasewych, Flourtown, Pa.

[73] Assignee: Ogontz Controls Company, Willow Grove, Pa.

[21] Appl. No.: 28,075

[22] Filed: Apr. 9, 1979

[51] Int. Cl.³ .................... F16K 29/00; F16K 31/00
[52] U.S. Cl. .................................. 137/243; 251/333; 251/11
[58] Field of Search .................... 251/11, 63.4, 333; 137/625.37, 242, 243

[56] References Cited

U.S. PATENT DOCUMENTS

| | | | |
|---|---|---|---|
| 285,955 | 10/1883 | Barry | 137/625.37 |
| 986,184 | 3/1911 | Lilly | 137/625.37 |
| 995,484 | 6/1911 | Rogers | 251/318 |
| 1,621,638 | 3/1927 | McIntyre et al. | 137/242 |
| 2,045,113 | 6/1936 | Ward | 137/242 |
| 2,094,924 | 10/1937 | Musselman | 137/242 |
| 2,258,230 | 10/1941 | Warren | 137/242 |
| 2,642,254 | 6/1953 | Armstrong | 137/625.37 |
| 2,859,765 | 11/1958 | Streed | 137/242 |
| 3,117,590 | 1/1964 | Nelson et al. | 137/504 |
| 3,168,282 | 2/1965 | Latshaw, Jr. et al. | 251/333 |
| 3,322,139 | 5/1967 | Todashi et al. | 137/242 |
| 3,478,771 | 11/1969 | Johnson | 137/242 |
| 3,848,624 | 11/1974 | Bonike | 137/242 |
| 3,885,401 | 5/1975 | Bonike | 137/242 |
| 3,961,606 | 6/1976 | Wong | 251/11 |
| 4,073,466 | 2/1978 | Snyder | 251/63.4 |

FOREIGN PATENT DOCUMENTS

| | | | |
|---|---|---|---|
| 2158950 | 5/1973 | Fed. Rep. of Germany | 251/11 |
| 2381219 | 9/1978 | France | 137/625.37 |

OTHER PUBLICATIONS

"Condensate Temperature Control Valve," Ogontz Controls Company Bulletin, CTV–210, 1977.

*Primary Examiner*—Martin P. Schwardron
*Assistant Examiner*—A. Michael Chambers
*Attorney, Agent, or Firm*—Richard D. Weber

[57] ABSTRACT

A self-cleaning valve plug and seat assembly for use within a valve chamber comprises a seat member extending into the chamber and having an inwardly converging frustconical seating surface thereon. A cylindrical skirt portion extending inwardly coaxially from the seating surface includes ports therein connecting with a fluid passage extending axially through the seat member. A valve plug includes a cylindrical bore extending partway thereinto and adapting the plug for sliding movement over the seat member skirt portion. The plug includes a surface intersecting the bore at an actute angle to provide a circular cutting edge at the open end of the bore. Means are provided for moving the plug axially toward and away from the seat member so that the plug is disposed clear of the seat member ports in the open valve position and covers the ports in the closed valve position with the plug cutting edge engaging the seating surface of the seat member in fluid-tight sealing relation.

9 Claims, 7 Drawing Figures

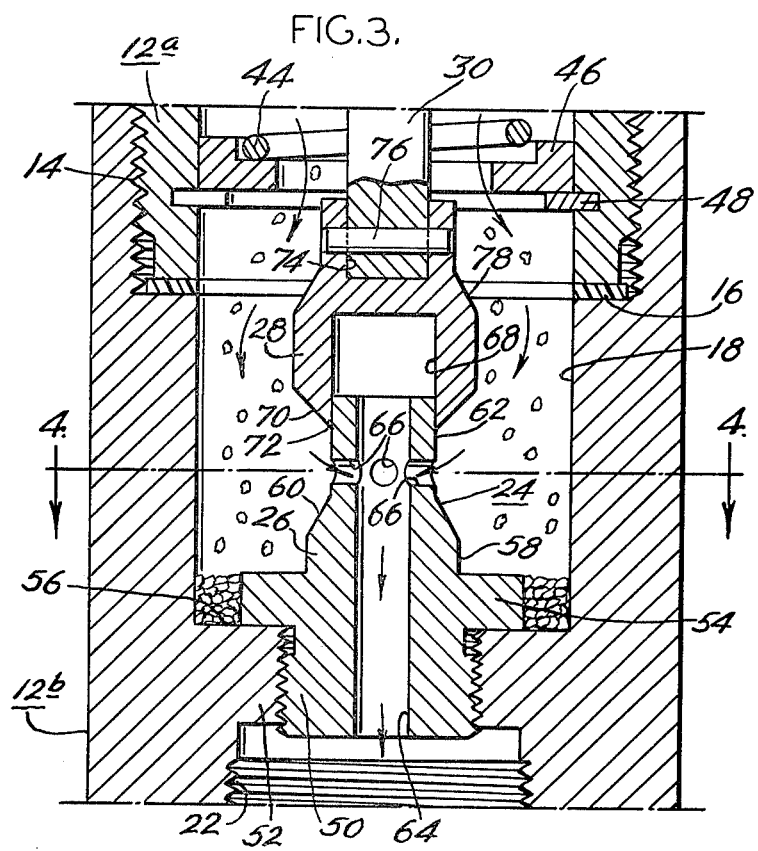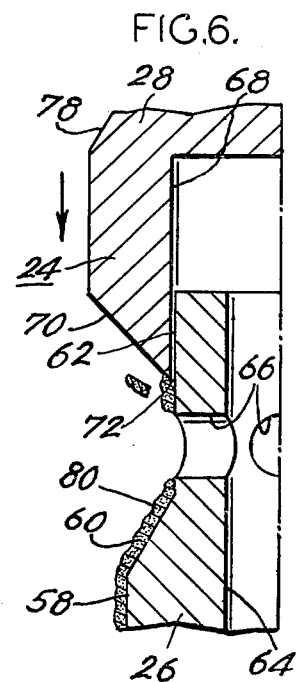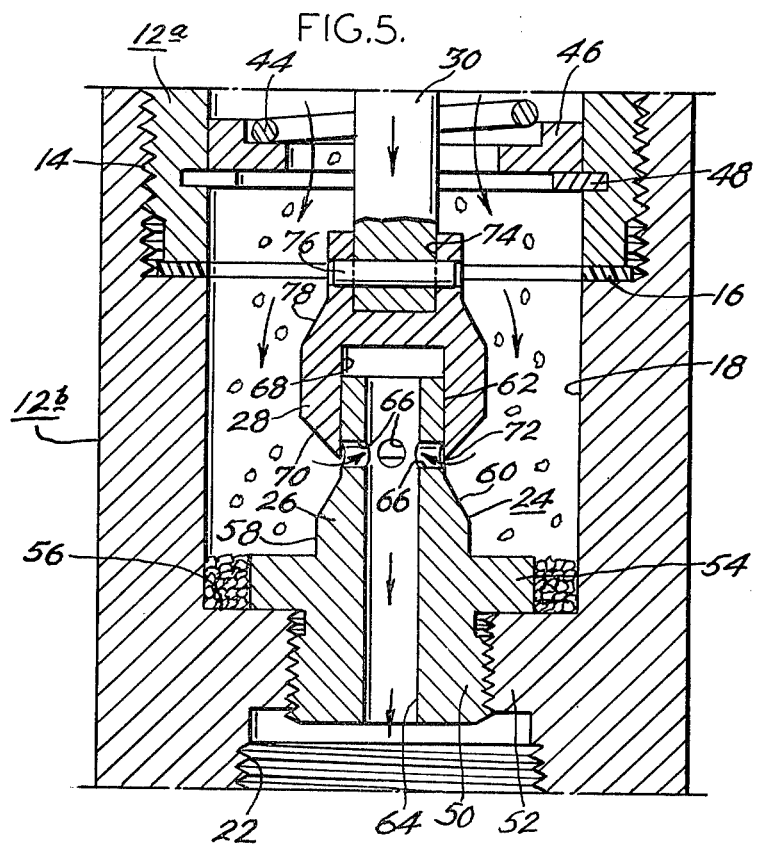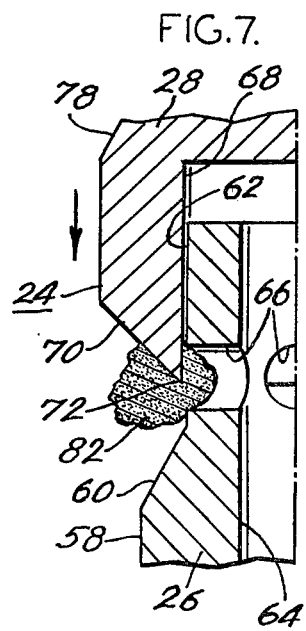

SELF-CLEANING VALVE PLUG AND SEAT ASSEMBLY

BACKGROUND OF THE INVENTION

The present invention relates generally to valves for controlling fluid flow and relates more particularly to a valve plug and seat assembly adapted for use with fluids containing dirt, minerals or other materials likely to foul conventional valve surfaces. The present valve plug and seat assembly is particularly well suited for use with steam condensate drain systems.

In a conventional steam condensate discharge valve which the present valve plug and seat assembly is designed to replace, the valve plug comprises a conical element adapted to cooperate with a frusto-conical valve seat. Actuating means are provided for automatically moving the valve plug toward and away from the valve seat to control flow through the valve.

Although the described conventional valve initially works well, after continuous use and particularly under conditions in which the valve is open for substantial periods of time, dirt or minerals become deposited on the valve surfaces and prevent the fluid-tight seating of the valve plug. Valve leakage results and can only be corrected by disassembly and cleaning or replacement of the plug and seat elements. A leaking valve permits a continuous escape of steam and a costly waste of energy.

SUMMARY OF THE INVENTION

In the present invention, the valve seat member extends inwardly into a valve chamber and comprises an inwardly converging frusto-conical seating surface which at its inner end intersects a cylindrical coaxial skirt portion. At least one and preferably a plurality of ports in the skirt portion connect with a fluid passage substantially coaxial with said skirt portion and connecting the valve chamber with a valve outlet port.

The valve plug comprises a member having a cylindrical bore extending partway thereinto and adapted for sliding movement over the seat member skirt portion. The plug is preferably formed with a frusto-conical surface converging downwardly to intersect the open end of said bore to thereby form a sharp circular cutting and sealing edge at the bore open end.

Means are provided for actuating the valve plug toward and away from said valve seat member with the plug being disposed clear of said valve member ports in the open position of the valve, while the plug covers the ports and the cutting edge engages the seat member seating surface in fluid-tight sealing relation in the closed position of the valve. The cutting edge in moving along the skirt portion cleans the skirt portion of foreign matter which may be deposited thereon and in passing over the ports shears through any foreign matter that might tend to jam within and block flow through the ports. When the plug cutting edge reaches the frusto-conical seating surface after closure of the ports, the sharp edge similarly cuts through any accumulated foreign matter on the seating surface and assures a tight sealing contact therewith.

It is accordingly a first object of the present invention to provide a novel valve plug and seat assembly which will close reliably to form a fluid-tight seal even under conditions wherein the handled fluid contains particulate material and/or foreign matter tending to adhere to the valve plug and seat surfaces.

Another object of the invention is to provide a valve plug and seat assembly as described, the structure of which induces a vortex action of the fluid passing therethrough to facilitate the passage of particulate matter through the valve.

Still another object of the invention is to provide a self-cleaning valve plug and seat assembly as described which due to its leak-tight construction conserves energy when used as a steam condensate discharge valve.

Still another object of the invention is to provide a self-cleaning valve plug and seat assembly as described which can readily be utilized on valves of conventional design.

A still further object of the invention is to provide a self-cleaning valve and plug assembly as described which is of a relatively simple construction and which can be economically manufactured.

BRIEF DESCRIPTION OF THE DRAWINGS

FIG. 3 is a view similar to FIG. 2 showing the valve in the fully opened position and showing the path of flow of particulate laden fluid therethrough;

FIG. 5 is a view similar to FIGS. 2 and 3 showing the valve in a partly closed position;

FIG. 6 is an enlarged fragmentary sectional view showing the manner in which the knife edge of the closing valve plug removes accumulated scale from the seat skirt; and FIG. 7 is a view similar to FIG. 6 showing the manner in which the knife edge of the valve plug slices through an obstruction caught within one of the seat ports.

DESCRIPTION OF THE PREFERRED EMBODIMENT

Figure 1:
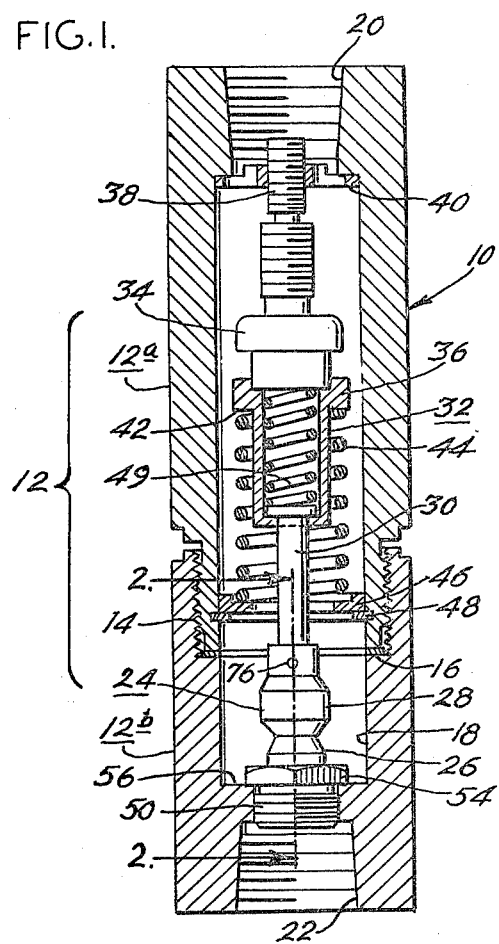
FIG. 1 is a sectional view taken longitudinally through a valve assembly embodying the present invention.

With reference to the drawings and particularly FIG. 1 thereof, the present invention is illustrated in the setting of a valve assembly generally designated 10 which is in many respects of a conventional construction. Although the valve assembly illustrated and described below is a temperature sensitive valve intended for use primarily as a condensate discharge valve, it will be apparent that the novel elements of the valve, namely the valve plug and seat, could be employed in a wide variety of valve types and configurations.

Figure 4:
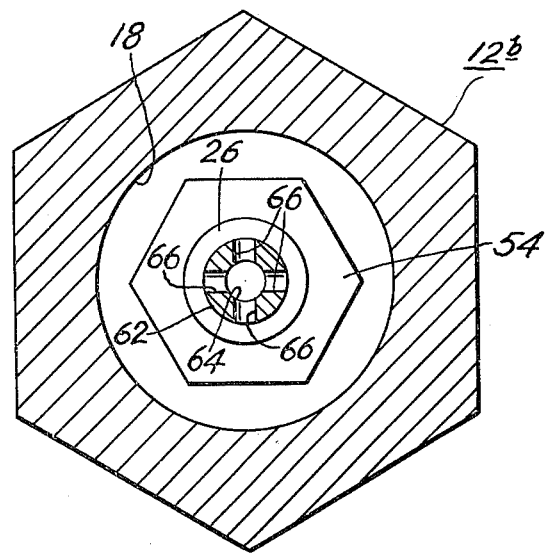
FIG. 4 is a reduced sectional view taken along line 4—4 of FIG. 3.
Figure 2:
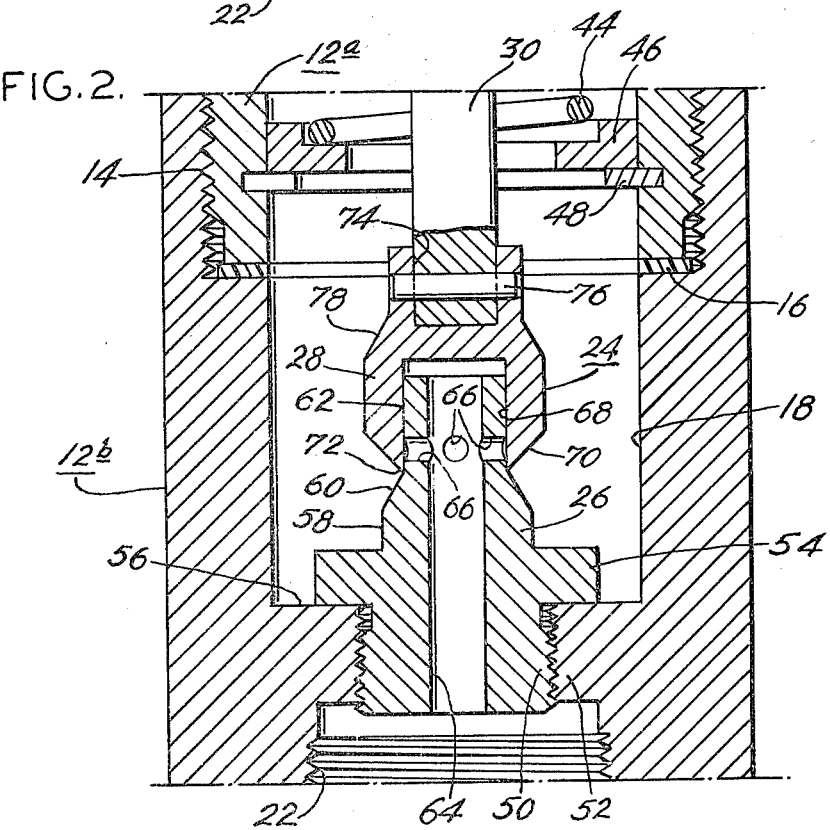
FIG. 2 is an enlarged sectional view taken along line 2—2 of FIG. 1 showing the valve in the closed position.

The valve assembly 10 includes a valve body 12 formed by upper and lower body portions 12a and 12b which are threadedly joined at 14, the joint therebetween being sealed by a seal ring 16. The body portions 12a and 12b, which as shown in FIG. 4 may have a hexagonal outer configuration, each include a coaxial bore therewithin which upon assembly of the valve body provides a closed valve chamber 18 within the valve body having a cylindrical side wall. An inlet port 20 opens into the chamber 18 at the upper end of the valve body, and an outlet port 22 opens from the chamber at the lower end of the valve body.

The present invention resides essentially in the valve and plug assembly 24 disposed in the lower end of the chamber 18. The assembly 24 includes a valve seat member 26 secured to the valve body and a valve plug 28 connected to a valve stem 30 for selective movement toward and away from the valve seat member 26. The details of the valve plug and seat assembly are described below.

A valve actuating mechanism 32 is provided within the chamber 18 to provide automatic actuation of the valve stem 30 and attached plug 28 to open and close the plug and seat assembly in accordance with temperature conditions of the fluid within the chamber 18. The valve actuating mechanism 32 comprises a thermal actuator 34 of a conventional solid-liquid phase change type, the lower end of which is seated within a counterbore in a cage or spring guide 36. A threaded piston 38 extending from the upper end of the actuator 34 is threadedly engaged within an apertured disc 40 seated against the upper end of the valve body chamber 18. The cage 36 includes a shoulder 42 against which the upper end of compression spring 44 is seated. The lower end of the spring 44 bears against an annular spring seat 46 secured in position within the chamber 18 by snap ring 48. The compression spring 44 accordingly serves to bias the cage upwardly against the actuator 34.

The valve stem 30 extends upwardly into a chamber within the cage 36 wherein the flanged upper end thereof bears against a second compression spring 49 seated at its upper end against the actuator 34. The spring 49 has a smaller spring rate than the spring 44 and serves to extend the valve stem and plug downwardly away from the actuator 34 until the flanged stem end engages the bottom of the cage.

Considering the details of the valve plug and seat assembly, the valve seat member 26 includes a threaded lower end portion 50 which is threadedly engaged with a neck portion 52 of the valve body adjacent the outlet port 22. The valve seat is threadedly inserted by means of a hexagonal flange 54 which seats against the lower end 56 of the chamber 18. The seat member 26 extends coaxially inwardly within the bore 18 and includes a cylindrical portion 58, an inwardly converging frusto-conical seating surface 60 and a cylindrical skirt portion 62 at the upper end thereof. A cylindrical bore 64 passes coaxially through the seat member 26. A plurality of ports 66 extend through the skirt portion 62 of the seat member and as shown for example in FIG. 3, permit a fluid flow from the chamber 18 through the seat bore 64 into the outlet port 22 when the plug 28 is in the raised or open position.

The plug 28 comprises a downwardly opening bore 68 extending partway thereinto, said bore having a length greater than the length of said seat member skirt portion 62 and having a diameter permitting a free sliding movement of the plug along the seat member skirt portion. The lower face of the plug 28 which in the preferred form of the invention comprises a downwardly converging frusto-conical surface 70 forms at its intersection with the wall of the bore 68 a sharp circular cutting edge 72.

The plug further includes an upwardly opening bore 74 into which the stem 30 is inserted and secured by means of pin 76 passing through aligned holes in the plug and bore. The shape of the plug exterior surface is preferably configured so as to direct the flow of heavy particulate matter away from the ports 66. For this purpose, a downwardly diverging frusto-conical surface 78 is provided on the plug which as shown in FIGS. 3 and 5 will direct heavier particulate materials toward the wall of the chamber 18 and they will settle on the lower end 56 of the chamber adjacent the flange 54 where they will not interfere with the fluid flow or the opening and closing of the valve plug.

For operation of the valve, the inlet port 20 is connecting with a source of fluid and the outlet port 22 if desired is connected to a conduit or may simply be opened to drain fluid discharged by the valve. As indicated above, the present valve is designed to automatically discharge condensate, for example, from a steam tracer line, and will accordingly open and close in response to changes in the temperature condition of a fluid within the chamber 18 and specifically the fluid enveloping the actuator 34. Upon reaching a predetermined elevated temperature, the actuator fluid will expand, thereby exerting a force on the piston 38 upwardly and causing the cage 36 to be moved downwardly with respect to the valve body. The valve stem 30 and the plug 28 will also move downwardly with the cage 36 under the influence of the inner spring 49. As the plug moves downwardly, as illustrated in FIG. 5, the ports 66 in the seat skirt 62 are covered by the plug bore 68 although some leakage flow passes between the skirt wall and the plug bore. As the plug continues downwardly, the sharp cutting edge 72 of the plug engages the frusto-conical seating surface 60 in sealing contact, stopping any further leakage between the skirt and plug bore. Although the actuator fluid may continue to expand under the influence of increasing temperature of the fluid in the chamber 18, the inner spring 49 permits the cage 36 to move downwardly without further movement of the valve stem or plug.

Upon a cooling of the actuator 34, such as by the collection of condensate in the chamber 18 to a level sufficient to envelope the actuator, the actuator will under the influence of spring 44 withdraw the piston 38, thereby allowing the cage to rise and, if the inner spring is fully extended, to raise the stem 30 and plug 28, thereby opening the ports 66 and permitting fluid flow from the chamber 18 therethrough.

The present valve and seat assembly is particularly adapted for use with fluids containing particulate matter which might block or permit leakage of conventional valves. The present valve and seat assembly is also well suited for valves which may remain open for long periods of time, permitting deposits such as mineral scale to build up on the cooperating valve surfaces and preventing the proper cooperative movement and closure of conventional valve elements.

Examples of the self-cleaning capabilities of the present valve plug and seat assembly are shown in FIGS. 6 and 7. In FIG. 6, the valve plug has been in the open position for a sufficient time to permit a buildup 80 of scale on the exposed surfaces of the seat member 26. As the plug 28 moves downwardly, the sharp lower edge 72 of the plug cleanly cuts the scale on the skirt surface and will subsequently cut into the scale deposited on the frusto-conical seat surface to permit a fluid-tight closure of the plug.

In FIG. 7, a piece of particulate matter 82 has become wedged in one of the ports 66. The descending plug by virtue of its sharp cutting edge 72 cleanly slices through the obstruction and clears the port for further use when the valve re-opens.

By viewing the operation of the valve through a clear plastic valve body and by utilizing a particulate laden fluid to observe the fluid paths, it has been found that a turbulent rotating vortex-like flow occurs in the chamber 18 adjacent the ports 66. This serves the desirable function of keeping the small particulate material which will readily pass through the seat ports from precipitating to the bottom of the chamber and causing an unnecessarily large build up of solids in that region.

Although the seating surface 60 has been shown and described as a frusto-conical surface, it will be evident that this surface could be formed as a concave or convex surface of revolution as long as the surface retained its upwardly and inwardly converging nature adjacent the skirt portion where it is engaged by the cutting edge 72. The term "substantially frusto-conical" is deemed to encompass such obvious variations.

It will furthermore be evident that the seating surface 60 illustrated in the drawings is considerably more extensive than necessary to provide cooperation with the plug cutting edge. However, this serves the purpose of diverting larger particles of foreign matter downwardly and outwardly away from the skirt ports.

Similarly, the cutting edge 72 of the plug is illustrated and described as formed by the frusto-conical surface 70 of the plug as it intersects the plug bore 68. This frusto-conical surface 70 may also be of any desirable configuration such as convex or concave as long as the cutting edge 72 is formed by surfaces intersecting at an acute angle. An edge formed by surfaces intersecting at an obtuse angle would tend to compact rather than cut through any scale or foreign matter formed on the skirt and seating surface and accordingly would be unsatisfactory. The cutting edge could be formed at surfaces intersecting at right angles with satisfactory results, but the preferred embodiment as illustrated utilizes an acute angle to form a knife-like cutting edge 72.

The number of ports 66 may vary, and as few as one or as many as eight or more will produce satisfactory results. A group of four ports spaced at 90° intervals as illustrated in the drawings has proven satisfactory in tests.

Manifestly, changes in details of construction can be effected by those skilled in the art without departing from the spirit and scope of the invention.

I claim:

1. A self-cleaning valve plug and seat assembly comprising a seat member and a valve plug, said seat member comprising a cylindrical skirt portion and a substantially frusto-conical seating surface coaxial with said skirt portion and converging toward and intersecting said skirt portion at an obtuse angle, a fluid passage extending through said seat member, and at least one port in said skirt portion connecting with said fluid passage; said valve plug comprising a cylindrical bore extending partway thereinto to permit sliding telescoping movement of said valve plug along the exterior of said seat member skirt portion, said plug having a circular cutting edge adjacent the open end of said bore, said cutting edge being formed by a surface of revolution and having an axis concentric with the axis of said plug bore and converging toward and intersecting said plug bore at an acute angle, and means for moving said plug toward and away from said seat member seating surface, said plug uncovering said valve member port in the open position of said assembly, said plug covering said port and said cutting edge engaging said seating surface in fluid-tight sealing relation in the closed position of said assembly.

2. The invention as claimed in claim 1 wherein said cutting edge is formed by the intersection of a frusto-conical surface of said plug with said plug bore.

3. In a valve comprising a hollow valve body defining a closed valve chamber therewithin, an inlet port in said body for connecting said chamber to a fluid source, an outlet port in said body for draining fluid from said chamber, a valve seat member having a fluid passage therein communicating with said outlet port, a valve plug within said chamber cooperatively mounted for selective movement with respect to said seat member to open and close said fluid passage therethrough, and means for selectively moving said plug with respect to said seat element, the improvement wherein said seat member comprises an inwardly extending cylindrical skirt portion and an inwardly converging seating surface, said inwardly extending cylindrical skirt portion of said seat member coaxial with and intersecting said seating surface, said seating surface comprising a surface of revolution converging toward and intersecting said skirt portion forming an obtuse angle with said skirt portion at its intersection therewith, the fluid passage of said seat member extending generally axially through said seat member, and at least one port in said skirt portion connecting said fluid passage with said valve chamber; said valve plug comprising a cylindrical bore extending partway thereinto and adapting said plug for sliding telescoping movement over said seat member skirt portion, said plug having a circular cutting edge formed by a surface of revolution and having an axis concentric with the axis of said plug bore and converging toward and intersecting said plug bore at an acute angle, said plug being clear of said skirt portion port in the open position of said valve, said plug covering said port and said cutting edge engaging said seating surface in fluid-tight sealing relation in the closed position of said valve.

4. The invention as claimed in claim 3 wherein said cutting edge is formed by the intersection of a frusto-conical surface of said plug with said plug bore.

5. The invention as claimed in claim 3 wherein said seating surface comprises a frusto-conical surface.

6. In a valve comprising a hollow valve body defining a closed valve chamber therewithin, an inlet port in the upper end of said body for connecting said chamber to a fluid source, an outlet port in the lower end of said body for draining fluid from said chamber, a valve seat member having a fluid passage therein communicating with said outlet port, a valve plug within said chamber cooperatively mounted for selective movement with respect to said seat member to open and close said fluid passage therethrough, and means for selectively moving said plug with respect to said seat element, the improvement wherein said seat member comprises an upstanding and inwardly extending member with the fluid passage thereof aligned substantially vertically, said seat member comprising a frusto-conical seating surface spaced above the lower end of said chamber, an inwardly extending cylindrical skirt portion of said seat member coaxial with said seating surface, said seating surface converging toward and intersecting said skirt portion at an obtuse angle, at least one port in said skirt portion connecting said fluid passage with said valve chamber; said valve plug comprising a cylindrical bore extending partway thereinto and adapting said plug for sliding telescoping movement over said seat member skirt portion, said plug having a circular cutting edge adjacent the open end of said bore, said cutting edge being formed by a frusto-conical surface of said plug and having an axis concentric with the axis of the plug bore and converging toward and intersecting said plug bore at an acute angle, said plug being clear of said skirt portion port in the open position of said valve, said plug covering said port and said cutting edge engaging said seating surface in fluid-tight sealing relation in the closed position of said valve.

7. The invention as claimed in claim 6 wherein said valve plug includes an upper outwardly and downwardly sloping surface adapted to direct particulate matter away from said port.

8. The invention as claimed in claim 6 wherein said means for selectively moving said plug with respect to said seat element comprises a temperature sensitive means for automatically actuating said plug in response to temperature changes of the fluid within said valve chamber.

9. The invention as claimed in claim 6 including a plurality of ports in said skirt portion connecting said valve chamber with said fluid passage in the open position of said valve.

* * * * *